United States Patent [19]

Michel

[11] 4,443,584

[45] Apr. 17, 1984

[54] METHOD FOR PREPARING GRAFT POLYOLEFIN

[75] Inventor: Alain Michel, Villeurbanne, France

[73] Assignee: Centre National de la Recherche Scientifique, Paris, France

[21] Appl. No.: 446,326

[22] Filed: Dec. 2, 1982

[30] Foreign Application Priority Data

Dec. 3, 1981 [FR] France ............................. 81 22802

[51] Int. Cl.$^3$ .................... C08L 23/30; C08L 51/06; C08L 33/14
[52] U.S. Cl. .................................. 525/286; 525/63; 525/904; 525/913
[58] Field of Search ............................... 525/286, 904

[56] References Cited

U.S. PATENT DOCUMENTS 3,876,609   4/1975   Schrage et al. ................. 260/42.28

FOREIGN PATENT DOCUMENTS 1177898   4/1959   France .
2136017   3/1972   France .

OTHER PUBLICATIONS

Chemical Abstracts, vol. 82, No. 8, Feb. 24, 1975 abridgement 44416n, p. 54, Columbus, Ohio (US).
European Polymer Journal, vol. 17, pp. 1145 to 1148, 1981 Printed in Great Britain.
Journal of Polymer Science: Polymer Chemistry Edition, vol. 16, 3077–3090 (1978) 1978 John Wiley & Sons, Inc.
Journal of Polymer Science, vol. XLVIII. pp. 177–189 (1960).
Chemical Abstracts, vol. 62, No. 8, 1965 abridgement 9253f, Columbus, Ohio (US).

*Primary Examiner*—Carman J. Seccuro
*Attorney, Agent, or Firm*—Parkhurst & Oliff

[57] ABSTRACT

Method for preparing a polyolefin modified by grafting, in which in a first phase, peroxides are grafted in known manner onto a polyolefin chain with a mixture of oxygen and ozone, wherein, in a second phase, a vinyl monomer with at least one epoxy function is added to the resulting peroxidized polyolefin, and in a third phase, the resulting mixture is polymerized.

The invention finds an application in the preparation of polypropylene with excellent adhesive properties especially with iron, leather and glassfibers.

9 Claims, No Drawings

METHOD FOR PREPARING GRAFT POLYOLEFIN

The invention relates to a method for preparing a graft polyolefin, and in particular a polyolefin with excellent adhesive properties.

It is already known that isotactic polypropylene does not adhere to ordinary metals such as for example iron. The same applies with other materials such as leather and glass fibers which are commonly used for reinforcing plastic materials. This therefore considerably limits the applications of the polypropylene.

It is the object of the present invention to overcome the aforesaid disadvantage by proposing a method for preparing this graft-modified polyolefin which consists in:

first, grafting peroxides in known manner, and in particular in a fluid bed, onto a main polyolefin chain using a mixture of oxygen and ozone;

then adding to the resulting peroxidized polyolefin, a vinyl monomer M comprising at least one epoxy function; and finally, and also in known manner, polymerizing the resulting mixture.

In practice and advantageously:

the polymer used is polypropylene, mainly in powder form;

said polypropylene contains antioxidants, this making it possible for the industrial polymers to be conveniently used;

the peroxides-grafting treatment is conducted at controlled temperature, particularly in the presence of a mixture of oxygen+ozone or of air+ozone; this reaction being exothermic, it is possible, if necessary, to cool the enclosure of the reactor where the reaction in a fluid bed takes place;

the proportion of monomer M can vary between 1 and 50 parts per one hundred parts of resin, but it is advantageously between 5 and 10 parts per one hundred parts of resin;

the mixture of monomer M+peroxidized polymer is obtained at room temperature (according to the "dry-blend" technique);

the monomer M is polymerized by a conventional processing operation, for example, in a internal mixer, or an extruding machine, on a calender, by injection or else in a fluid bed (encapsulation), in condensed phase for example, namely in powder or molten form.

The peroxidation of the polyolefins, and in particular of the polypropylene is well known (see for example the "European Polymer Journal" 1981—Vol. 17, pages 1145-1148). It is also well-known to use these peroxide-containing structures to initiate the radical-polymerization of the vinyl monomers (see for example the "Journal of Polymer Sciences" 1960—Vol. 48; pages 477-489 and 1978, Vol. 16, pages 3077-3090). Nevertheless, peroxidation by ozone is accompanied by a splitting of the macromolecular chains which is linked to the processes of self-oxidation, these processes being more or less rapid but controllable depending on the polymer used and on the conditions of ozonization. Moreover, the reduction of the molecular weight entails a modification of the mechanical and rheologic properties of these polymers which have no adhesive properties.

It has also been proposed to disperse into a polypropylene matrix, peroxides of low molecular weight such as for example tertiobutyl or benzoyl hydroperoxide, in order to initiate polymerization of said monomers in condensed phase, in molten phase or in aqueous or organic dispersion. But here, the grafting reaction is solely achieved by a transfer reaction, this leading to very limited grafting rates, for example, mostly around 10% and even to mixtures of homopolymers instead. Moreover, these methods do not confer to the treated polymer any special or even substantial enough adhesive properties (See for example the Chemical Abstracts Vol. 82, No. 8 of Feb. 24, 1975, page 54, Abstract No. 4416n; and also French Patent published under No. 2 136 017 or U.S. Pat. No. 3,876,609).

According to the method of the invention, on the contrary, the grafting reaction is initiated by peroxidic structures already grafted onto the polyolefin chain, polypropylene in particular, this having the effect of considerably increasing the overall grafting rate with respect to the aforementioned techniques, and this by at least ten times more, which is unexpected and also enables to obtain adhesive polyolefins, this being new.

The modified polypropylenes prepared according to the invention, have the following characteristics:

molecular weight in number ($\overline{M}_n$) between a few thousands and 100,000;

melting point identical to that of nonmodified polypropylene, i.e. 160°-165° C.;

the limiting viscosity range at zero frequency in the molten state $\eta_o$ ($10^4$ to $10^6$ poises at 170° C.) makes it possible to use these polymers in all the conventional operations of conversions recalled hereinabove;

average relaxation time at 170° C. between a few tenths of a second and a few second excellent adhesive properties especially with leather, iron, and glassfibers, this being new and unexpected.

The following examples are given nonrestrictively to illustrate the invention.

EXAMPLE 1

In a fluidization enclosure, at room temperature (25° C.), are placed 200 g of industrial isotactic polypropylene in powder form, containing no antioxidant or stabilizing compound, and having a mean viscometric molecular weight ($\overline{M}_v$) of about 327,000.

The polypropylene is fluidized by way of a current of oxygen and ozone. The ozone is produced by an electric discharge ozonizer of trademark TRAILIGAZ, model Labo 70, marketed by TRAILIGAZ. The oxygen flow rate is adjusted to 1000 liters per hour (l/h) and the ozone concentration is 12 mg per liter (mg/l).

During ozonization, the evolution of the molecular weight is recorded by viscometric measurement in decalin at 135° C. after desactivation of the peroxides and in the presence of 0.1% of 2-6-di tributyl-4-methylphenol as antioxidant, applying the relation of Mark Houwink with $a=0.8$ and $K=1.1\times10^{-2}$ (ml/g). The proportion of peroxides is determined in the presence of potassium iodide in a homogeneous medium in decalin at 135° C.

The propylene so treated is very sensitive to the action of ozone. After fifteen minutes in contact, the cutting of the chains entails a modification of the rheological properties and a drop in the mechanical properties of the basic polymer.

After a fifteen minutes treatment at room temperature, meaning without cooling, a white powder is obtained:
which contains $1.1 \times 10^{-5}$ of peroxidic group per gramme;
whose viscometric molecular weight $\overline{M}_v$ is about 151,000,
and whose rheological properties at 170° are:
$\eta_o$: $3.0 \times 10^5$ poises,
$\lambda$: 2 seconds.

Then 34 g of that peroxidized polypropylene powder (PPOOH) are taken and mixed at room temperature with 8 g of glycidyl methacrylate so as to obtain a dry-blend.

Said dry-blend is then placed in a Brabender plastograph in order to initiate the polymerization reaction of the glycidyl methacrylate during the mixing. This polymerization takes place very rapidly, within one or two minutes, immediately the temperature reaches 120°–130° C. for a speed of rotation of 100 rpm. The polymerization is therefore complete when the melting point of the polymer is reached, i.e. 165° C.

The resulting graft polymer is in white powder form, and shows the following properties:
melting point 165° C.,
molecular weight ($\overline{M}_v$) 130,500,
at least 60% of the introduced monomer (i.e. 8 g) are really grafted onto the polypropylene chain,
rheological parameters at 170° C.:
$\eta_o$: $5 \times 10^4$ p
$\lambda$: 0.4 sec.

EXAMPLE 2

It is processed as in Example 1, but with a commercial polypropylene containing a phenolic antioxidant.

The stabilized polypropylene is less sensitive to the action of ozone, at least as long as the temperature does not exceed 70°–80° C.

The grafting yield obtained is here also near 60%.

EXAMPLE 3

It is proceeded as in Example 2, but replacing the Brabender plastograph mixer by a Papenmeier internal mixer. The same results are obtained.

EXAMPLE 4

In a 10-liter fast mixer of the Papenmeier type, are placed, at room temperature:
4000 g of stabilized polypropylene powder (sold under the mark Napryl 6140 by Naphtachimie,)
400 g of glycidyl methacrylate,
10 g of tertiary butyl hydroperoxide (sold under the mark TRIGONOX AW 70 by NOURYLANDE).

This mixture is extruded in strip form with a BUSS mixer, using a sheet die, in the following conditions and with the following temperature range:
mixing screw (200°–202°–205° C.),
extruding screw (205°–210° C.),
extruder die (220° C.),
speed of mixing screw: 50 rpm.
speed of extruding screw: 74 rpm.

In these conditions, the output is 5.4 kg/hour.

The polymer obtained is in white powder form, with a melting point of 160° C. in which only 10% of the introduced monomer (400 g) is really grafted on the polypropylene; and moreover, this polymer, although it has exactly the same rheologic characteristics at 170° C. as the graft polymer of Example 1, shows no adhesive properties with iron, leather or glassfibers.

This proves the unexpected effect obtained with the method according to the invention.

EXAMPLE 5

It is proceeded as in Example 4, but without the tertiary butyl hydroperoxide and replacing the Napryl 61400 polypropylene by 400 g of peroxidized polypropylene (PPOOH) prepared according to Example 1.

The polymer obtained has the same properties as that obtained in Example 1, but is also very adhesive to iron.

EXAMPLE 6

It is proceeded as in Example 2, replacing the glycidyl methacrylate by glycidyl acrylate.

The products obtained are similar.

EXAMPLES 7 to 10

The two polymers obtained according to Examples 4 and 5 are extruded, then granulated and used:
either to prepare the composite materials containing glassfibers (Ref. 421-33 of OCF);
or to prepare films by lamination with a view to testing adhesiveness.

The mixture of epoxidized propylene and glassfibers are extruded at 220° C. in the same conditions as in Example 4 and they are next granulated before being injected into a standardized mold to obtain bar-bell type test-pieces. The mechanical characteristics of this polymer are given in the accompanying Table.

These results show on the whole that according to the invention the mechanical properties of the polypropylene-glassfibers composite materials are improved, where the epoxidized polypropylene is concerned, in two steps (Example 9). Also to be noted is a substantial increase of the impact resistance and to tensile and flexural strengths, this being compatible with an improvement of the cohesion between glassfibers and polymer matrix through oxirane grafts.

EXAMPLE 11

The following experiment is conducted to show the adhesive properties of epoxidized polypropylene with iron.

The particles of epoxidized polypropylene obtained according to Examples 1 and 5 are extruded at 200°–220° C., then they are made into films by hot-lamination. Polypropylene-epoxy and polypropylene-iron sandwich complexes were produced by means of a preheating at 185° C. for 5 minutes. Lamination is achieved through the rollers of a mixer heated at 120° C. The adhesive forces are assessed by way of a peeling test conducted with an angle of 0° at a speed of 10 mm/minute.

The adhesive force in Newton/cm of the polypropylene epoxidized according to the known method (Example 4) is 18, whereas on the contrary, the film prepared according to the invention, i.e. according to Examples 1 and 5, is undetachable from iron.

By way of indication, the adhesive force measured in the same conditions of a peroxidized polypropylene (PPOOH) prepared according to the preamble of Example 1, is substantially nil.

This proves the excellent adhesive properties of the polypropylene epoxidized according to the invention.

EXAMPLE 12

It is proceeded as in Example 1, replacing the polypropylene by another polypropylene of melt flow index 2, of $\overline{M}_v$ 235,000, with a viscosity $\eta_o$ at 190° C. of $1.4 \cdot 10^5$ P and a average relaxation time $\overline{\lambda}$ of 2.35 secs. Peroxidation is achieved with air-ozone mixture in fluid bed at 50° C. for 15 minutes.

The PPOOH obtained has the following characteristics:

$0.325 \cdot 10^{-5}$ peroxide group per gramme of polymer, $\overline{M}_v = 225.000$.

After total decomposition of the peroxides under nitrogen, said polymer is found to have the following properties:

$\overline{M}_v = 180.000$, viscosity, $\eta_o$ at 190° C.: $4.1 \cdot 10^4$ poises, $\overline{\lambda}$: 0.5 second melt flow index: 6. cl EXAMPLE 13

10 parts of glycidyl methacrylate are grafted, in a plastograph tank for 25 mins. at 185° C., onto the peroxidized polypropylene obtained according to Example 12.

A compact epoxidized polypropylene is thus obtained which has the following properties:

viscosity $\eta_o$ at 190° C.: $7.10_3$ poises, $\overline{\lambda}$: 0.08 secs.

melt flow index: about 50.

Comparative examples 12 and 13 illustrate the considerable and unexpected improvement of the fluidity of the graft polymers prepared according to the invention, over the peroxidized polypropylene obtained according to the teaching of the prior art. This makes it possible:

first, to use said epoxidized polypropylenes as binding agents in textile webs or mats, in glassfibers for example;

and second, to considerably improve the spinning-extruding speed of these polymers, which, up to now, could never have been done economically.

The epoxidized graft polypropylenes according to the invention have many advantages. Amongst these are:

improved mechanical properties;

excellent cohesion with the reinforcing glassfibers in plastic materials;

particularly good adhesive properties, especially with iron, leather and glassfibers, which up to now had never been obtained especially with the peroxidized polypropylene:

exceptional improvement of the fluidity of the starting polymers, this, quite unexpectedly, enabling to increase their spinning-extruding speed. t,0120

What is claimed is:

1. A method for preparing a polyolefin modified by grafting, in which in a first phase, peroxides are grafted in known manner onto a polyolefin chain with a mixture of oxygen and ozone, wherein, in a second phase, a vinyl monomer with at least one epoxy function selected from the group consisting of glycidyl methacrylate and acrylate is added to the resulting peroxidized polyolefin according to the dry blend mixing technique, and in a third phase, the resulting mixture is polymerized during a processing operation selected from the group consisting of passage through an internal mixer, passage through an extruder, passage over a calender or an injection press, or passage through a fluid bed.

2. The method as claimed in claim 1, wherein the polymer is polypropylene in powder form.

3. The method as claimed in claim 2, wherein said polypropylene contains antioxidants.

4. The method as claimed in claim 1, wherein the peroxidation is conducted in a fluid bed.

5. The method as claimed in claim 1, wherein the grafting of the vinyl monomer with the epoxy function is achieved by a radical-producing polymerization reaction.

6. The method as claimed in claim 1, wherein the grafting of the vinyl monomer is achieved in condensed phase.

7. The method as claimed in claim 1, wherein the proportion of epoxidized vinyl monomer is between 5 and 10 parts per one hundred parts of peroxidized resin.

8. The method as claimed in claim 1, wherein the polymerization occurs at a temperature of at least 200° C.

9. A method for preparing a polypropylene modified by grafting wherein in a first phase peroxides are grafted, in a fluid bed, onto a polypropylene in powder form with a mixture of oxygen and ozone; in a second phase, a vinyl monomer with at least one epoxy function selected from the group consisting of glycidyl methacrylate and acrylate is mixed with the resulting peroxidized polypropylene according to the dry-blend mixing technique, the proportion of the vinyl monomer with epoxy functions being comprised of between five and ten parts per 100 parts of peroxidized polypropylene; and then in a third phase, the grafting of the monomer is achieved by a radical-producing polymerization reaction in condensed phase during a processing operation selected from the group consisting of passage through an internal mixture, passage through an extruder, passage through a fluid bed, passage over a calendar, and passage over an injection press.

* * * * *